(12) United States Patent  (10) Patent No.: US 8,705,692 B2
Umstadter et al.  (45) Date of Patent: Apr. 22, 2014

(54) LASER-BASED ACCELERATOR FOR INTERROGATION OF REMOTE CONTAINERS

(75) Inventors: Donald Umstadter, Lincoln, NE (US); Sudeep Banerjee, Lincoln, NE (US)

(73) Assignee: NUtech Ventures, Inc., Lincoln, NE (US)

( * ) Notice: Subject to any disclaimer, the term of this patent is extended or adjusted under 35 U.S.C. 154(b) by 796 days.

(21) Appl. No.: 12/778,302

(22) Filed: May 12, 2010

(65) Prior Publication Data

US 2010/0290587 A1 Nov. 18, 2010

Related U.S. Application Data (60) Provisional application No. 61/215,962, filed on May 12, 2009.

(51) Int. Cl.
*G01N 23/04* (2006.01)
(52) U.S. Cl.
USPC .................. 378/57; 378/86; 250/310
(58) Field of Classification Search
CPC ... G01V 5/0016; G01V 5/0066; H05G 2/001; H05G 2/003; H05G 2/008
USPC .............. 378/57, 86, 87, 88, 89; 250/310
See application file for complete search history.

(56) References Cited

U.S. PATENT DOCUMENTS

| 5,115,459 | A | 5/1992 | Bertozzi |
|---|---|---|---|
| 5,235,606 | A | 8/1993 | Mourou et al. |
| 5,420,905 | A | 5/1995 | Bertozzi |
| 5,637,966 | A | 6/1997 | Umstadter et al. |
| 5,789,876 | A | 8/1998 | Umstadter et al. |
| 6,332,017 | B1 | 12/2001 | Carroll et al. |
| 6,687,333 | B2 | 2/2004 | Carroll et al. |
| 7,120,226 | B2 | 10/2006 | Ledoux et al. |
| 7,286,638 | B2 | 10/2007 | Ledoux et al. |
| 7,321,604 | B2 | 1/2008 | Umstadter et al. |
| 7,372,262 | B2 | 5/2008 | Bertozzi et al. |
| 7,409,042 | B2 | 8/2008 | Bertozzi et al. |
| 7,564,241 | B2 | 7/2009 | Barty et al. |
| 7,634,058 | B2 | 12/2009 | Ledoux et al. |
| 7,693,261 | B2 | 4/2010 | Robinson et al. |
| 7,693,262 | B2 | 4/2010 | Bertozzi et al. |
| 2007/0098142 | A1* | 5/2007 | Rothschild et al. ............. 378/57 |

OTHER PUBLICATIONS

Cunningham et al., "High-energy Laser-accelerated Electron Beams for Long-range Interrogation", Application of Accelerators in Research and Industry: Twentieth International Conference, AIP Conference Proceedings, vol. 1099, pp. 638-642 (Mar. 2009).*

(Continued)

*Primary Examiner* — Glen Kao
(74) *Attorney, Agent, or Firm* — Picadio Sneath Miller & Norton, P.C.; Robert L. Wagner (57) ABSTRACT

A method and apparatus for generating high-energy beams of electrons or x-rays through laser wakefield acceleration to remotely examine containers is disclosed. By scanning the beam of electrons or x-rays across a container, an inspector can remotely determine whether the containers contain items of interest, such as special nuclear materials, without having to manually inspect the contents of the container. The invention can be compact enough to be portable, which provides for the flexibility to examine a variety of different containers under a variety of different conditions.

45 Claims, 6 Drawing Sheets

(56) References Cited

OTHER PUBLICATIONS

Banerjee et al., "All-laser-driven, MeV-energy X-ray source for detection of SNM", 2008 IEEE Conference on Technologies for Homeland Security, pp. 1-6 (May 12, 2008).*

Umstadter et al., "Development of a Source of Quasi-Monochromatic MeV Energy Photons", AIP Conference Proceedings, vol. 1099, (Jan. 1, 2009), pp. 606-609.*

Banerjee et al., "Stable, Monoenergetic 50-400 MeV Electron Beams with a Matched Laser Wakefield Accelerator", Proceedings of PAC09, (May 7, 2009), Retrieved from the Internet: <http://epaper.kek.jp/PAC2009/html/th4gb.htm>, <http://epaper.kek.jp/PAC2009/talks/th4gbc02_talk.pdf>, and <http://epaper.kek.jp/PAC2009/papers/th4gbc02.pdf>.*

* cited by examiner

LASER-BASED ACCELERATOR FOR INTERROGATION OF REMOTE CONTAINERS

RELATED APPLICATION

The present application claims the benefit of co-pending U.S. Provisional Patent Application No. 61/215,962, filed May 12, 2009, the contents of which are hereby incorporated herein by reference.

FIELD OF INVENTION

The present invention generally relates to laser-based accelerators and, more particularly, to laser wakefield accelerators for remotely examining containers.

BACKGROUND OF THE INVENTION

Sizeable numbers of containers enter the country each day, whether through ports, airports, or border crossings. The risk exists that these containers will be used to smuggle hazardous materials into the country, such as nuclear, chemical, or biological weapons or materials. In addition, there are many instances where particular facilities or buildings need to be secured against the threat of attack from weapons being surreptitiously brought onto the premises, either through cargo that is delivered or in vehicles themselves. Because the level of threat to a location may change, having a portable system that can be placed temporarily or semi-permanently in a location is extremely useful. Individually inspecting containers by hand or through passive techniques in these circumstances is cumbersome, inefficient, expensive, and in many cases ineffective.

In addition to safety applications, there are other needs for inspecting containers, such as with mining operations or storage of waste (including nuclear waste). It is desirable to quickly and efficiently determine whether containers full of rock, dirt, ore, or waste contain materials of interest, such as minerals, metals, or elements. High-energy sources can penetrate the container and remotely examine its contents to determine whether it contains materials of interest.

With respect to safety inspections, passive techniques to locate nuclear materials, such as using Geiger counters and neutron emission detectors, can easily be fooled and render false positives from materials as innocuous as cat litter, which can carry trace amounts of radioactivity in the clay that comprises the litter. More troubling, they can easily be fooled into rendering a false negative by effective shielding of the nuclear material. Either false result is detrimental because it wastes the time and resources of the inspectors or entirely misses the threat being sought.

To overcome these problems, others have proposed using high-energy electrons or x-rays from LINACs and Bremsstrahlung sources to examine the containers. These high-energy sources can easily penetrate the walls of the containers, enabling inspectors to examine the contents of the containers in situ without having to manually inspect them. In addition, such sources can readily distinguish false threats from real threats, thereby reducing the number of false positive indications. More importantly, it is difficult to shield threatening materials from these high-energy sources due to their penetrating power. These sources can also detect the presence of shielding materials, which raises red flags and invites further inspection.

While these high-energy sources have many desirable traits, they are not without their own problems. First, many of these sources create x-ray or electron beams with large energy spreads, which are undesirable for a number of reasons. Typically only a narrow band of energy is needed for detection, so most of the energy in these sources is wasted. This wasted energy creates problems, such as increasing the signal noise, which makes it more difficult to detect the materials of interest, and creating a greater radiation safety hazard to inspectors and those near the system. Second, these systems can be large and difficult to move due to the necessity of using a LINAC, which only has a modest accelerating field and is therefore large and heavy. Third, these systems can be unstable and difficult to synchronize to other components, such as lasers, that may be used to create x-rays. Fourth, most LINACs are not tunable, so the system has a fixed energy and cannot be easily adjusted.

SUMMARY OF THE INVENTION

Accordingly, the present invention employs a new and novel method of using high-energy electrons and x-rays to remotely examine containers. Unlike prior methods, the current invention creates an electron beam with a narrow energy spread by using laser wakefield acceleration. By using a laser to create the electron beam, much of the stability and synchronization issues can be overcome. In addition, the energy of the electrons and x-rays is tunable. Further, because laser wakefield accelerators have extremely large accelerating fields, they can be much smaller than conventional accelerators. Thus, the entire system can be made much smaller and more portable than was previously possible, which dramatically increases its potential functionality and usefulness.

Laser wakefield accelerators use ultrafast (<1 picosecond), high peak-power (>1 terawatt) lasers to create plasma waves that accelerate electrons in high-gradient accelerating fields. These sub-picosecond laser pulses can be created from a variety of laser systems, such as those based on either the techniques of chirped pulse amplification or optical parametric chirped pulse amplification, using such gain media as Ti:sapphire, Nd:glass, Nd:YAG, $Nd^{3+}$:YLF, BBO, LBO, KDP, and other systems recognized by those skilled in the art. Such laser systems can be comprised of a single type of gain media or multiple types of gain media, such as the crystals and glasses mentioned above, as well as fibers, diodes, and others recognized by those skilled in the art. The chirped pulse amplification technique of creating ultrafast, high-intensity laser pulses is known and described in U.S. Pat. No. 5,235,606 and is incorporated by reference. The particular type of gain media and laser design is not critical—instead, the characteristics of the laser pulses emitted from the laser system are what is important.

The ultrafast, high peak-power laser pulse is focused down to micron sizes onto a target, typically a gas such as hydrogen, helium, or nitrogen emanating from a gas jet nozzle, although other gases, clusters, discharge ionized plasma, or even low-density solid targets can be used. By concentrating the light from the laser pulse down to such a small spot size, light intensities greater than $10^{18}$ W/cm$^2$ are achieved at the focal region.

As the laser pulse moves into the target, the leading edge of the high intensity of the laser pulse ionizes the gas, creating an underdense plasma. The ponderomotive force from the main portion of the laser pulse pushes electrons in the plasma away from the regions of highest laser intensity as the laser pulse moves through the plasma. As the laser pulse passes through the plasma, it creates a longitudinal density wave (or wake) comprised of regions with excess electrons (negatively charged regions) and regions with more ions than electrons (positively charged regions) with a phase velocity that moves at nearly the speed of light. This redistribution of electrons creates a large longitudinal electric field that can accelerate electrons trapped in this wave to high energies.

For laser wakefield acceleration, optimal conditions occur when the laser pulse duration is approximately equal to half the plasm a period, or $\tau_l \approx \tau_p/2 = 2\pi/\omega_p$, where $\tau_l$ is the laser pulse duration, $\tau_p$ is the plasm a period, and $\omega_p$ is the plasma frequency. As predicted by 1-D cold fluid theory, the maximum axial electric field of the relativistic plasma wave is the "wave breaking" field: $E_{WB} = (m_e c \omega_p/e)\sqrt{2(\gamma_p - 1)}$, where $m_e$ is the electron rest mass, c is the speed of light, $\omega_p = \sqrt{4\pi^2 n_{eo}/m_e}$ is the electron plasm a frequency, $n_{eo}$ is the am bient electron density, e is the electron charge, $\gamma_p = 1/\sqrt{1 - v_p^2/c^2}$, and $v_p$ is the phase velocity of the plasma wave. For laser wakefield conditions, the maximum axial electric field of the relativistic plasma wave can exceed 1 GeV/cm.

In the so-called "bubble regime," the ponderomotive force of the laser pulse is mostly transverse (to the direction of pulse propagation), expelling almost all of the electrons at the location of the laser pulse, and leaving an ion channel. Just behind the laser pulse, the electrons that were expelled from the cavity get pulled back toward the ion channel and become effectively trapped in the first cycle of the wake wave. The high degree of beam loading effectively cancels the remaining oscillations of the wave. Under these conditions, a quasi-monoenergetic self-trapped electron beam is produced. Other methods of injecting electrons, involving multiple laser pulses (optical injection), or density discontinuities can also cause electron trapping. In order to achieve the maximum accelerated electron energy, the length of the plasma adjusted to match the dephasing length, which is determined by the phase velocity of the plasma wave relative to the accelerated electron velocity, the former being determined by the plasma density. The length of the plasma should not be longer than the distance over which the electrons starts to out-run the wake and thus start to lose energy. Various targets besides simple gas jets can be used, such as discharge ionized plasmas (including capillary discharges).

As discussed in more detail in U.S. Pat. No. 7,321,604 and incorporated by reference, an x-ray beam can be produced by counter-propagating an intense, ultrafast laser pulse through a beam of electrons. The laser pulse Thomson scatters off of the electron beam and frequency up-shifts to form a backscattered beam of x-rays moving in the same direction as the electron beam. In this case, the electron beam is produced through the laser wakefield method described above.

By adjusting the laser and plasma parameters (such as the laser power, intensity, and pulse duration and the plasma density and length), electron beams with different energies can be created, thereby creating a tunable electron beam source. The x-ray beam energy ($E_x$) can also be adjusted by varying the energy of the electron beam, or by varying the photon energy (hv) of the counter-propagating laser pulse (such as by using a harmonic generation crystal), according to the relation $E_x = 4\gamma^2 (hv)$, where $\gamma$ is the relativistic factor associated with the energy of the electron beam. For instance, an x-ray of maximum energy $E_x = 3.8$ MeV can be produced by scattering a photon of energy hv=1.5 eV from an electron beam of energy 400-MeV ($\gamma=800$). The divergence angle of the x-ray beam depends on the energy of the electron beam as $\theta \sim 1/\gamma$. For a given electron beam energy, this divergence angle can be adjusted by adjusting the focusing of the scattering beam. For a scattering pulse of many optical cycles per pulse, the energy spread of the x-ray beam is roughly twice the energy spread of the electron beam. An estimate of the number of x-ray photons produced is given by the simple formula $N_{ph} = \alpha a^2 N_u N_e$, where $N_u$ is the number of electron "wiggler" or oscillation periods, $\alpha = e^2/hc = 1/137$, is the fine structure constant, and $a$ is the normalized vector potential of the focused laser field. For $N_u = 10$, and $a = 3$, this formula yields $N_{ph} \sim N_e$, the number of electrons per pulse. As discussed in more detail in U.S. Pat. No. 5,637,966 and incorporated by reference, the laser wakefield used to create the electron beam can also be created by using multiple laser pulses of different pulse durations per laser cycle that resonantly drive the plasma.

Once the electron or x-ray beam is created, it can travel through a significant amount of air to remotely examine the contents of containers to determine if they contain materials of interest. For example, a 500 MeV electron has a mean free path of 6 cm in iron and 624 m in air. This allows the system to remotely examine containers under a variety of conditions and circumstances.

In some examples, an apparatus for remotely examining contents of a container, the apparatus comprising: a laser source that produces a sub-picosecond laser pulse with at least a terawatt peak power; an adjustable support; an optical focusing element mounted on the adjustable support; a laser target positioned to receive the sub-picosecond laser pulse and mounted on the adjustable support; a laser wakefield beam of electrons that emerges from the laser target due to focusing the sub-picosecond laser pulse by the optical focusing element onto the laser target; wherein the adjustable support rotates about at least one axis of rotation and rotates the laser wakefield beam of electrons in a direction to examine the contents of the container; a detector that detects a signal emitted from interaction between the laser wakefield beam of electrons and contents of the container.

In another example, an apparatus for remotely examining contents of a container, the apparatus comprising: a laser source that produces a first sub-picosecond laser pulse with at least a terawatt peak power and a second laser pulse; an adjustable support; a first optical focusing element mounted on the adjustable support; a second optical focusing element mounted on the adjustable support; a laser target positioned to receive the first sub-picosecond laser pulse and mounted on the adjustable support; a laser wakefield beam of electrons that emerges from the laser target due to focusing the first sub-picosecond laser pulse by the first optical focusing element onto the target; a Thomson-scattered x-ray beam that emerges from the laser wakefield beam of electrons due to focusing the second laser pulse by the second optical focusing element onto the laser wakefield beam of electrons; wherein the adjustable support rotates about at least one axis of rotation and rotates the Thomson-scattered x-ray beam in a direction to examine the contents of the container; and a detector that detects a signal emitted from interaction between the Thomson-scattered x-ray beam and contents of the container.

In a further example, an apparatus for remotely examining contents of a container, the apparatus comprising: a laser source that produces a sub-picosecond laser pulse with at least a terawatt peak power; an adjustable support; an optical focusing element mounted on the adjustable support; a laser target positioned to receive the sub-picosecond laser pulse and mounted on the adjustable support; a laser wakefield beam of electrons that emerges from the laser target due to focusing the sub-picosecond laser pulse by the optical focusing element onto the target; an x-ray converter target positioned to receive the laser wakefield beam of electrons and mounted on the adjustable support; a Bremsstrahlung x-ray beam that emerges from the x-ray converter target due to the laser wakefield beam of electrons striking the x-ray converter target; wherein the adjustable support rotates about at least one axis of rotation and rotates the x-Bremsstrahlung ray beam in a direction to examine the contents of the container; a detector that detects a signal emitted from interaction between the Bremsstrahlung x-ray beam and contents of the container.

In yet another example, a method for remotely examining contents of a container, the method comprising: producing a sub-picosecond laser pulse with at least a terawatt of peak power; focusing the sub-picosecond laser pulse onto a target to create a laser wakefield beam of electrons; rotating the laser wakefield beam of electrons about at least one axis of rotation to examine the container; and detecting a signal emitted from the interaction of the laser wakefield beam of electrons with contents of the container.

In yet a further example, a method for remotely examining contents of a container, the method comprising: producing a first sub-picosecond laser pulse with at least a terawatt of peak power; producing a second laser pulse; focusing the first sub-picosecond laser pulse onto a laser target to create a laser wakefield beam of electrons; focusing the second laser pulse onto the laser wakefield beam of electrons to create a Thomson-scattered x-ray beam; rotating the Thomson-scattered x-ray beam about at least one axis of rotation to examine the container; and detecting a signal emitted from the interaction of the Thomson-scattered x-ray beam with contents of the container.

In still another example, a method for remotely examining contents of a container, the method comprising: producing a sub-picosecond laser pulse with at least a terawatt of peak power; focusing the sub-picosecond laser pulse onto a laser target to create a laser wakefield beam of electrons; directing the laser wakefield beam of electrons to strike an x-ray converter target to create a Bremsstrahlung x-ray beam; rotating the Bremsstrahlung x-ray beam about at least one axis of rotation to examine the container; and detecting a signal emitted from the interaction of the Bremsstrahlung x-ray beam with contents of the container.

BRIEF DESCRIPTION OF THE DRAWINGS

The accompanying drawings illustrate embodiments of the invention and explain the principles of the invention.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION OF THE INVENTION

Three exemplary embodiments of the invention are described below. It will be understood by those skilled in the art that variants of these exemplary embodiments can be used to practice the inventions claimed. Where components of the three exemplary embodiments are substantially identical, they will be designated by a prime mark on the reference number.

General Description

Figure 1:
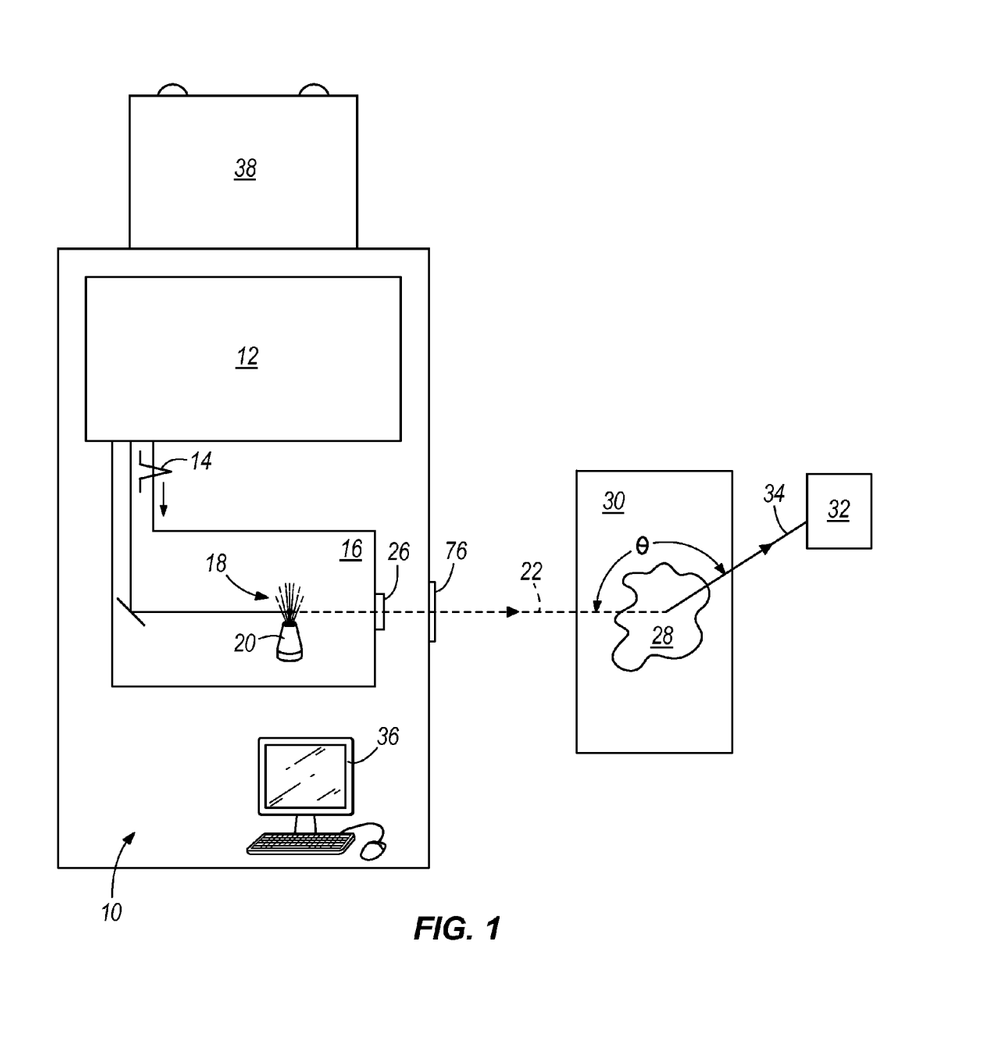
FIG. 1 shows a general schematic of a laser wakefield system for examining containers.
Figure 2:
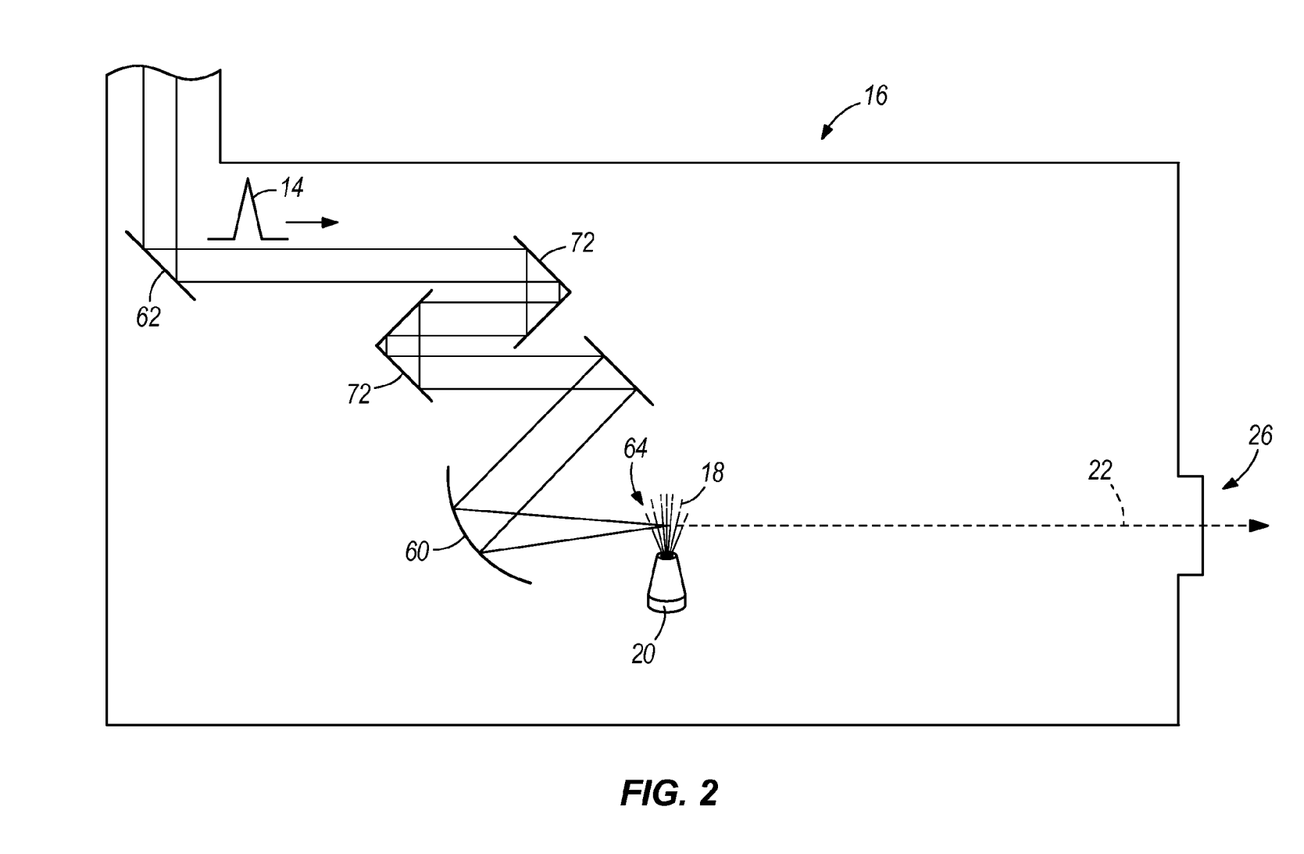
FIG. 2 shows a detailed schematic of an electron beam system.

Described below are three exemplary systems for remotely examining containers using high energy beams of electrons or x-rays. As shown in FIG. 1, the high energy systems 10 are comprised of an ultrafast, high peak-power laser 12 that creates sub-picosecond laser pulses 14 with over a terawatt peak power. As shown in FIG. 2, these laser pulses 14 are transported in vacuum to a target chamber 16, where the laser pulses are focused onto helium gas 18 from a gas jet nozzle 20, thereby creating an energetic beam 22 of electrons from the laser wakefield method of acceleration. In the case of the first exemplary x-ray embodiment shown in FIG. 3, a portion 24 of the laser pulse 14' is split prior to focusing the laser pulse 14' and is focused back against the energetic beam 22 of electrons to create an energetic beam 22' of x-rays due to Thomson scattering. As shown in the alternative exemplary x-ray embodiment of FIG. 4, the laser pulse 14" creates a electron beam 22, which strikes a thin x-ray converter target 88 to create x-ray beam 22" due to Bremsstrahlung. The energetic beam 22 then exits the target chamber 16 through a portal 26.

By moving the laser pulse(s) 14 and 24 and the gas jet nozzle 20, the energetic beam 22 can be moved to scan the contents 28 of various containers 30 placed near the high energy system 10. Various detectors 32 can then be used to collect and interpret the signals 34 received from the interaction of the energetic beam 22 with the contents 28 of the container 30.

The entire system 10 is controlled by computers 36, which monitor and control the laser 12 and energetic beam 22, control the scanning of the energetic beam 22, control the detector 32, and interpret the information received from the detector 32. Because of the relatively small size of the system 10, it can be fit onto a large truck or semi-tractor trailer 38, making the entire system portable.

Laser System

A table-top ultrafast, high peak-power laser system creates an intense pulse of laser light using the chirped-pulse amplification method. Generally, the laser system is comprised of an oscillator, which produces short, low-energy laser pulses at a high-repetition rate. A subset of the pulses are selected and then stretched to form a series of longer pulses. These longer pulses are progressively amplified to higher energies and then compressed back down to a short pulse duration to create an ultrafast, high peak-power laser pulse.

Figure 5:
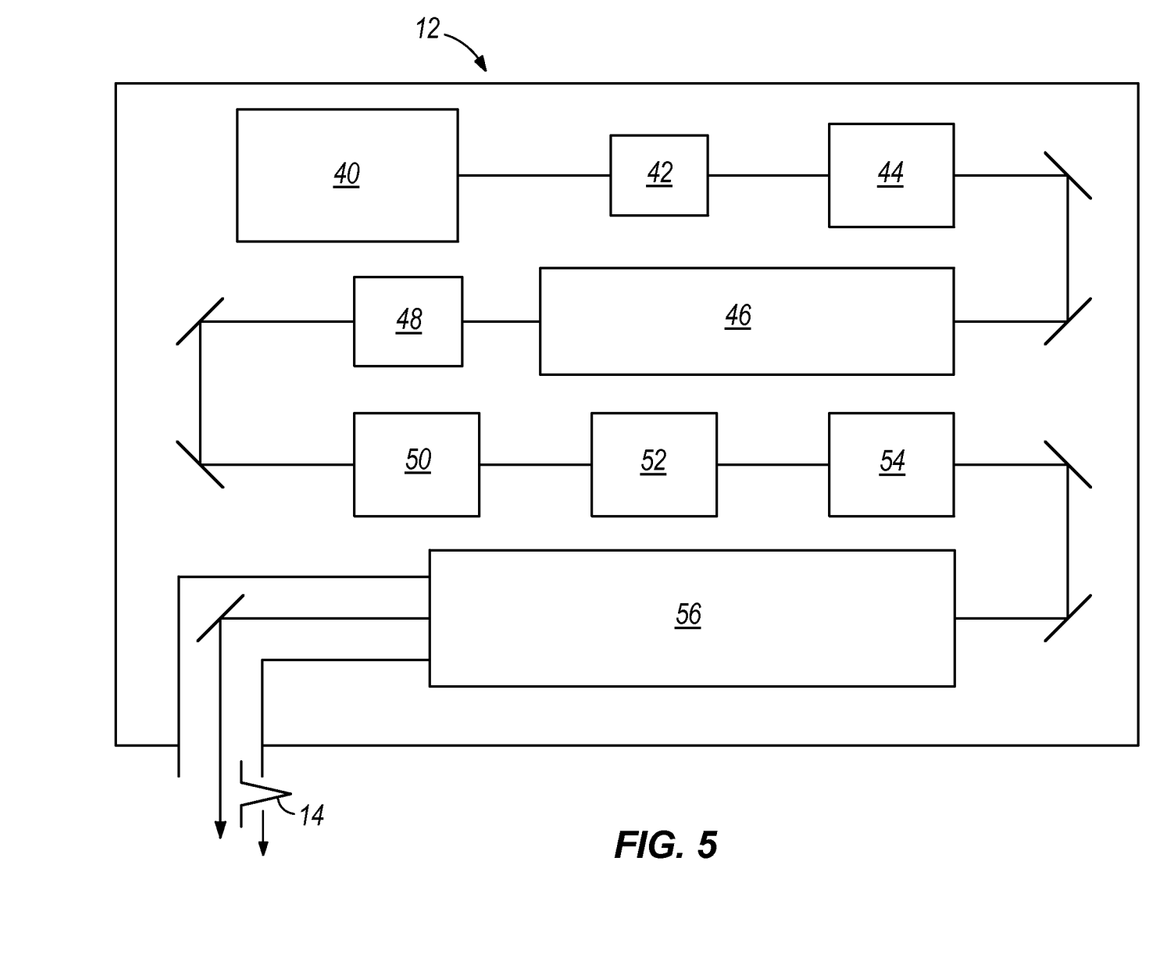
FIG. 5 shows a detailed schematic of the laser system.

More specifically, as shown in FIG. 5, the laser system consists of a Ti:sapphire mode-locked oscillator 40 to produce nJ-level pulses at 76 MHz with a pulse duration of 12 fs. An acousto-optical modulator 42 steps down the frequency of the pulses to 1 KHz, and the pulses are then stretched to approximately 300 ps in duration using a stretcher 44 based on an aberration-free Offner triplet (composed of both concave and convex mirrors and a grating). Alternatively, the stretcher can be based on chirped fiber Bragg gratings. These 1 KHz stretched pulses are amplified in a Ti:sapphire multi-pass amplifier 46 to approximately 1 mJ in energy and pass through an electro-optic pulse cleaner 48 to create 10 Hz pulses with an intermediate contrast ratio of better than $10^{-9}$. The 10 Hz pulses pass through three flashlamp-pumped Ti:sapphire amplifiers 50, 52, and 54 to boost the pulse energy from 1 mJ to 60 mJ to 2 J to a final energy of 5 J. The laser pulse is expanded to a 3" diameter before being compressed using a large pair of diffraction gratings 56 that are placed in a vacuum chamber. The laser pulse 14 is propagated to the target chamber 16 in a vacuum or near-vacuum environment in order to avoid instabilities and non-linear effects caused by the passage of intense light through air.

The final laser system characteristics are
30 fs pulse duration
3.5 J energy per pulse
10 Hz repetition rate
805 nm central wavelength
140 TW peak power
$10^{-8}$ nanosecond contrast ratio.

By using an acousto-optical modulator 42, the spectral characteristics of the laser 12 can be adjusted to compensate for gain narrowing and red-shifting in the amplifier, as well as to compensate the second and higher order phases to obtain clean and short pulse durations.

In order to increase the stability of the laser system and its performance, the entire laser 12 is maintained in a temperature and humidity-controlled class 10000 clean room, and care is taken to reduce vibrations through vibration-damped tables and other isolation techniques.

The entire laser 12 is small enough to fit into a 200 ft² area.

Electron Beam

As shown in FIG. 2, in order to create an energetic beam of electrons 22, the laser pulse 14 is propagated to a vacuum target chamber 16 and focused onto a jet of gas 18 from a supersonic gas jet nozzle 20. The optics and gas jet 20 are mounted on a small breadboard 58 (not shown) to allow the electron beam to be moved under computer control 36.

A 1 m focal length paraboloid 60 focuses the laser pulse 14 with the assistance of a large aperture dielectric deformable mirror 62 integrated with a wavefront sensor. Measurements of the focal spot of the laser pulse 14 indicate that the 2.7" diameter incident beam focuses down to a 16 micron spot size with top-hat profile containing 75-80% of the incident energy (95% Strehl ratio). The vacuum focal intensity of the laser pulse 14 is $5 \times 10^{18}$ W/cm².

Figure 6:
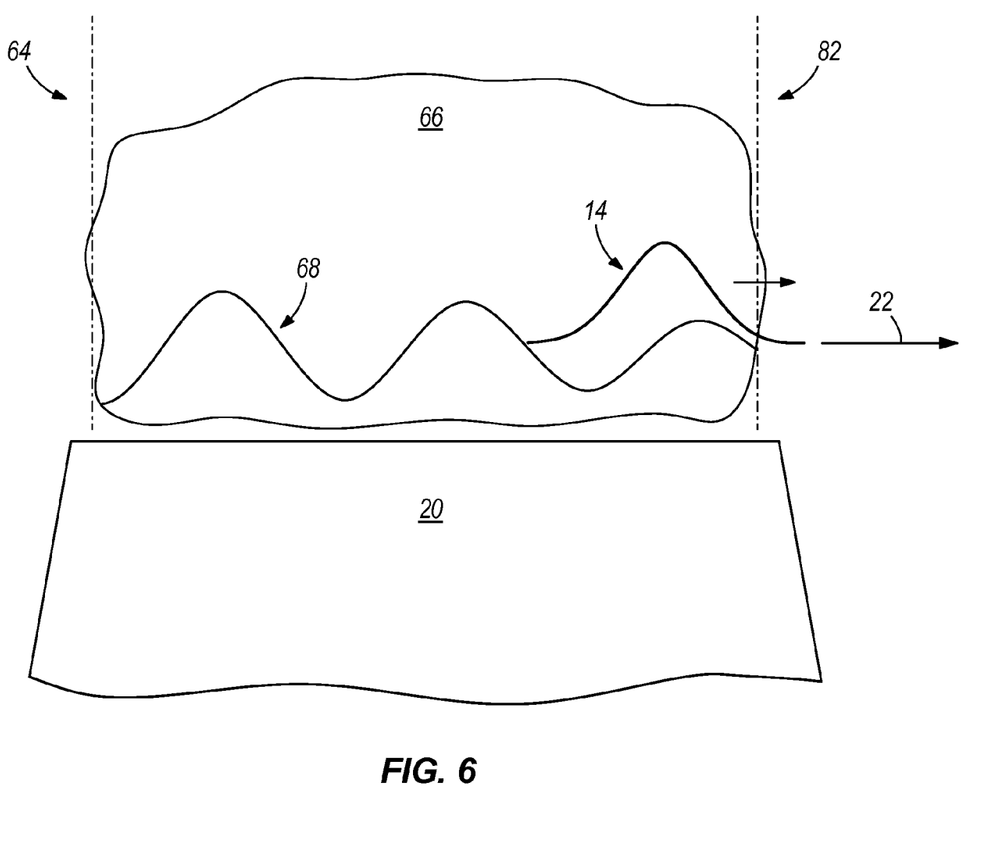
FIG. 6 shows the laser wakefield process to produce an accelerated electron beam.

The laser pulse 14 is focused approximately 300-400 microns above a 3 mm supersonic helium gas jet nozzle 20 such that the focal spot is placed at the interface 64 between the gas and vacuum. Because helium fully ionizes at approximately $10^{16}$ W/cm², the helium 18 in the path of the laser pulse 14 is fully ionized and forms a plasma 66 before the main part of the laser pulse 14 reaches the gas 18. As shown in FIG. 6, the density of the plasma 66 is tuned to be near the resonant density for the laser pulse 14 to create a laser wakefield 68, and the peak of the laser pulse 14 is located at the density minimum (the trough) of the plasma wave 68. The interaction of the main part of the laser pulse 14 with the newly-formed plasma 66 creates an approximately 3 mm laser wakefield plasma wave 68 with an accelerating gradient of approximately 1.1 GeV/cm. An electron beam 22 forms in this "bubble regime." Once electrons are trapped in the laser wakefield 68, they are accelerated by the large laser wakefield 68 over its 3 mm length to reach energies exceeding 100 MeV.

For this exemplary embodiment, the highest energy electron beam occurs when the laser pulse duration is less than 30 fs, the Strehl ratio is at least 0.9, the laser power is approximately 40-45 TW, the nanosecond beam contrast is at least $10^{-8}$, the acceleration length is 3 mm, and the electron densities are near the resonant density between $2 \times 10^{18}$ cm$^{-3}$ and $2 \times 10^{19}$ cm$^{-3}$ (which corresponds to a backing pressure of approximately 50 PSI for the nozzle used).

Under typical conditions, this exemplary embodiment produces a 320 MeV electron beam 22 with a relative energy spread of 10%, an angular divergence of 6 mrad (full beam), and a pointing stability approximately the size of the beam. The normalized emittance of the electron beam 22 is approximately 17 mm mrad, and the total accelerated charge is approximately 600 µC. By varying the intensity of the laser pulse 14 or the plasma 66 density, the energy of the electron beam 22 can be adjusted.

In order to scan a container 30, this narrow electron beam 22 must be moved, much like an electron beam in a television set is rastered across phosphors. A typical cargo container is 20 feet long, 8 feet wide, and 9.5 feet high. If a cargo container is placed 100 feet from the electron beam source, the electron beam must be scanned through approximately a 12° angle to examine the entire container. Different geometries will, of course, require different scanning ranges.

The electron beam 22 can be scanned through vertical and horizontal dimensions by changing the direction of the laser pulse 14 and gas jet 20 under computer control 36. All of the optical components and the gas jet 20 are mounted on a breadboard 58. The breadboard 58 is, in turn, mounted on horizontal and vertical rotation stages 70 and 74 (not shown) which allow the breadboard 58 to be rotated horizontally and vertically. By rotating the horizontal rotation stage 70, the laser pulse 14 and gas jet 20 will rotate in unison and change the horizontal direction of the electron beam 22. Similarly, by rotating the vertical rotation stage 74, the laser pulse 14 and gas jet 20 will rotate in unison and change the vertical direction of the electron beam 22. As is shown in FIG. 2, by using corner cubes 72 that can be themselves rotated and translated horizontally and vertically, the alignment of the laser pulse 14 can be maintained as the breadboard 58 is rotated horizontally or vertically. Through this process, the electron beam 22 can be scanned through arbitrary angles horizontally or vertically. One skilled in the art would recognize that this is not the only method for rotating the optics and target. The electron beam 22 then exits the vacuum target chamber 16 through a thin glass window 26, which does not appreciably scatter or interfere with the electron beam's characteristics. The entire vacuum target chamber 16 is small, fitting within a 5 foot by 4 foot area.

Examination of Containers

With a scannable, high-energy, nearly monochromatic electron beam 22, various containers 30 of interest can be readily examined. The rotation stages 70 and 74 and corner cubes 72 in the vacuum target chamber 16 are connected to a computer control system 36 to adjust them so as to cover the entire cross-section of the container 30 of interest to examine its contents 28.

For instance, as shown in FIG. 1, cargo/shipping containers 30 delivered at ports can be placed near the exit window 76 of the system for examination. Other containers can also be examined, such as those used in cargo planes or on semi-tractor trailers. Luggage containers used on planes, trains, or boats can be examined. Not only can containers delivered by various vehicles be examined, but the vehicles themselves are containers that can be examined. For example, cars or trucks entering a facility, small boats entering a harbor, or small planes arriving at an airport all can be placed next to or pass by the electron beam 22 for examination. Alternatively, ore containers used at mining facilities, ore or rock transmitted along a conveyor belt, or nuclear waste containers can be inspected as they pass by the system to determine if they contain materials of interest, such as metals, crystals, minerals, or elements.

Detection of Contents Using Electron Beam

As the electron beam 22 passes through the container of interest 30, it will interact (or not interact) with the container's contents 28. The resulting interactions create signals 34 that are detected by detectors 32 through a variety of radiographic techniques in order to determine whether the container 30 contains contents 28 of interest to the inspector.

For instance, a fluorescent screen that is fiber-coupled to a digital electronic array detector can be placed behind the container such that the electron beam 22 must pass through the container to reach the fluorescent screen/array detector. Materials with higher densities, such as fissionable, nuclear materials (e.g., uranium or plutonium), will scatter the electron beam (or cause it to lose energy), while lower density materials will experience less or no noticeable scattering or energy loss. By scanning the entire container, an image much like a medical x-ray can be formed of the contents of the container without having to open it. The size, shape, composition (elemental or isotope) of nuclear materials and materials used to shield them (e.g., lead) will be readily apparent. Even more detail (tomographic images) can be obtained by analyzing the trajectories (tracks) or energy losses of the scattered electrons. This can be obtained by replacing the fluorescent screen/array detector with a detector composed of multiple layers of arrays of photomultiplier tubes coupled to scintillators.

Another method of detection uses nuclear activation to detect the presence of materials of interest. This involves inducing photodisintegration processes (γ-n, γ-p, or photofission) induced by the incident electron beam 22, and the subsequent detection of the spectrum of the induced gamma rays or neutrons. The gamma ray is detected by means of detectors composed of materials such as Ge, CZT, or NaI. The neutrons are detected by means of neutron time of flight measurements.

Still another method of detection uses nuclear resonance fluorescence spectroscopy to detect the presence of materials of interest. In this case, the incident electron beam 22 excites a nuclear resonance in the nuclei of the materials of interest, and the excited nuclei emit gamma rays with isotope-specific spectral signatures. Various filtering techniques can be used to enhance to signal-to-background ratio in order to unambiguously distinguish the nuclear material of interest from other materials, such as those discussed in U.S. Pat. Nos. 7,409,042 and 7,693,262.

X-Ray Beam

Figure 3:
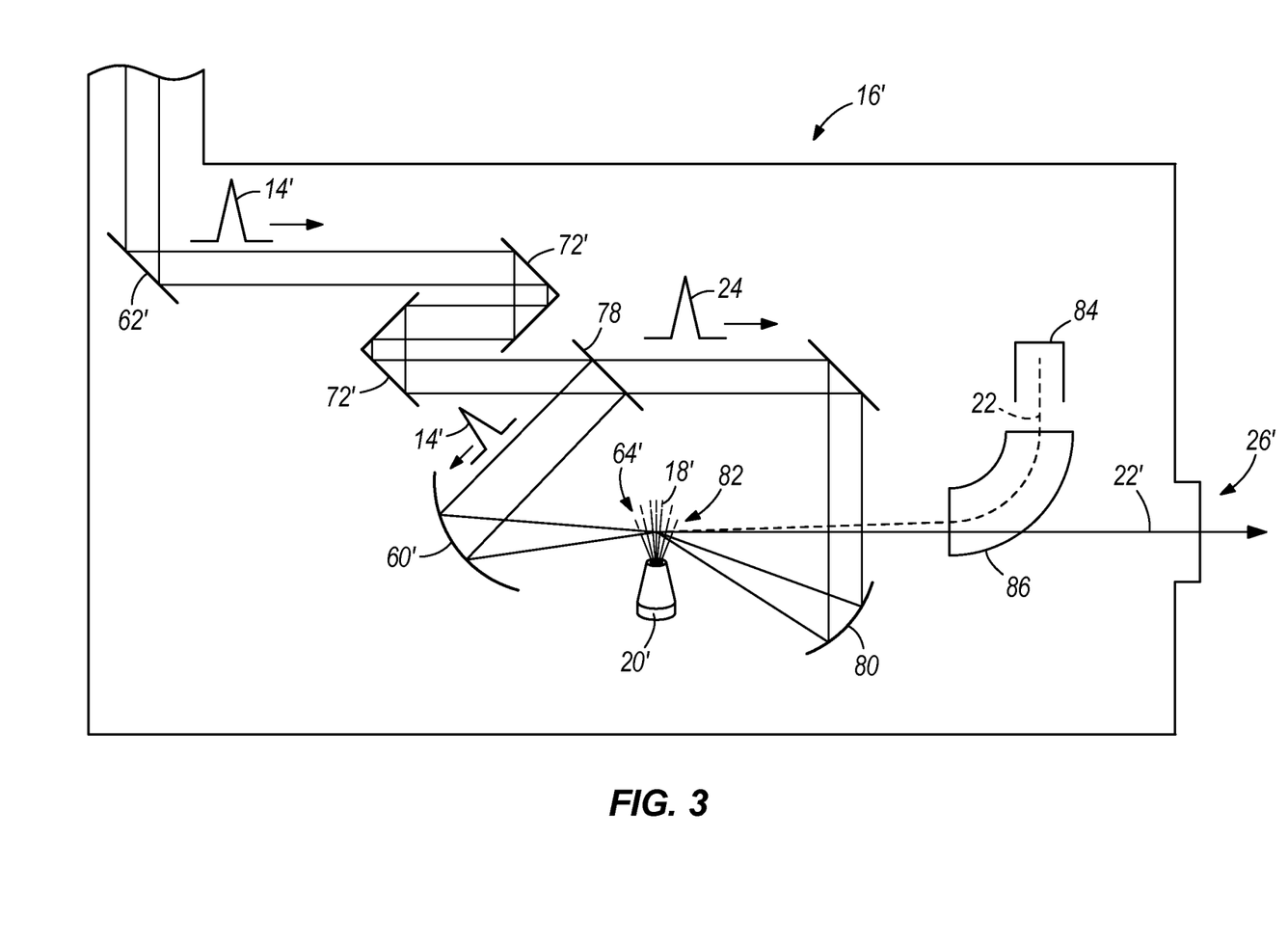
FIG. 3 shows a detailed schematic of an x-ray beam system.

In another exemplary embodiment, an x-ray beam 22' is used to directly examine the contents 28 of a container 30 instead of using the laser wakefield produced electron beam 22. As shown in FIG. 3, the system is identical to the previously described exemplary embodiment, except that a portion (approximately 20%) of the laser pulse 14' is split from the laser 12' prior to focusing in the helium gas 18' using beam splitter 78. Alternatively, the laser pulse is split before compression and two independent compressors are used for each laser pulse to independently adjust the durations of the compressed pulses. This second laser pulse 24 is temporally synchronized with the first laser pulse 14' and focused to nearly counter-propagate against the electron beam 22 to create a highly energetic x-ray beam 22' from Thomson scattering.

The second laser pulse 24 has similar characteristics to the first and is focused using a 200 cm focal length paraboloid 80 to create a vacuum focal intensity of less than $10^{18}$ W/cm². The second laser pulse 24 is positioned off-angle by approximately 170-175° from the focal axis of the first laser pulse 14' so as not to direct the laser energy back into the laser system 12'. Alternatively, the second laser pulse 24 can be positioned on the focal axis) (180°) if the laser 12 includes protection (such as Faraday rotators) to protect the laser 12 from the second laser pulse 24 being reflected back into the laser 12. The second laser pulse 24 spatially and temporally overlaps with the electron beam 22 at the exit point 82 (shown in FIG. 6) of the laser wakefield accelerating region 68' in order to Thomson scatter the second laser pulse 24 off of the electron beam 22. Under these conditions, a 2.6 MeV x-ray beam 22' with an approximately 10% relative energy spread is produced that co-propagates with the electron beam 22. For a scattering pulse of many optical cycles per pulse, the energy spread of the x-ray beam is roughly twice the energy spread of the electron beam.

Like with the electron beam embodiment, the x-ray beam 22' is also movable in order to scan a container 30. As with the prior embodiment, two rotation stages 70' and 74' and corner cubes 72' are used to rotate the laser beams 14' and 24 and the gas jet nozzle 20' in order to direct the x-ray beam 22' through an arbitrary horizontal or vertical angle. Alternatively, the entire breadboard 58—containing focusing optics, gas jet, and accelerator components—is rotated. The energy of the x-ray beam 22' can be varied by adjusting the energy of the electron beam 22. For an electron beam of given energy, the divergence angle of the x-ray beam 22' can be easily adjusted by adjusting the position of the best focus of the second beam 24 with respect to the target (e.g., gas jet 20) or by aperturing the x-ray beam 22' with collimators.

In order to isolate x-ray beam 22', the electron beam 22 is deflected into an appropriate beam dump 84 by placing strong magnets 86 (>1 Tesla) in the path of the electron beam 22 and x-ray beam 22'. Because the x-ray beam 22' is not comprised of charged particles, it is unaffected by the magnets 86. The beam dump 84 is designed to contain the radiation from the electron beam 22 so it does not pose a safety hazard or interfere with the measurements using the x-ray beam 22'.

Figure 4:
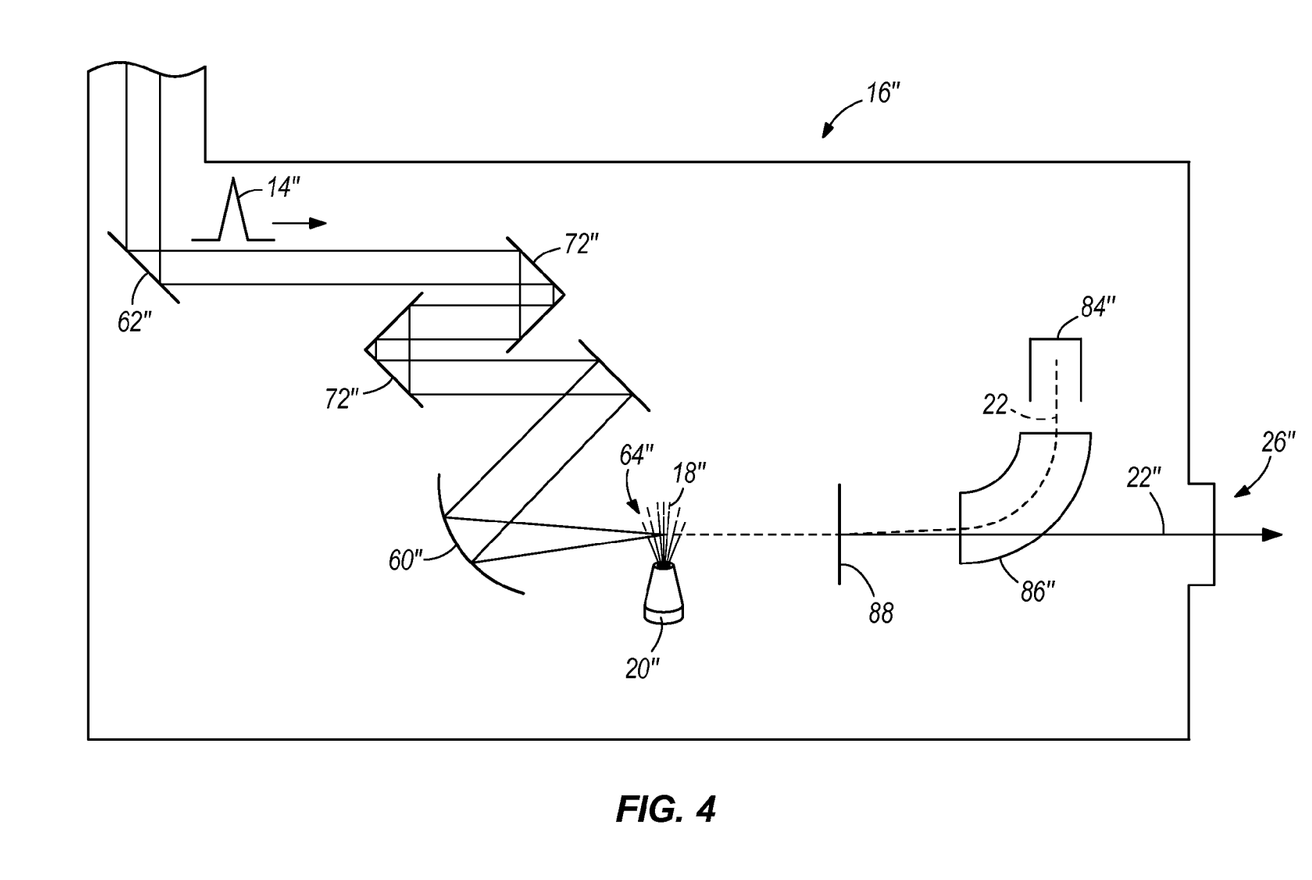
FIG. 4 shows a detailed schematic of an alternate x-ray beam system.

As shown in FIG. 4, an alternative exemplary method of creating a x-ray beam involves laser pulse 14" creating electron beam 22 using the electron beam exemplary method described earlier. Electron beam 22 then strikes a thin foil 88 of tantalum that is approximately 2 mm thick. Other materials, such as beryllium and iron, in thicknesses between 0.01 and 1.0 electron ranges can also be used to generate x-rays. A portion of the electron beam 22 is converted into a beam of x-rays 22" from the Bremsstrahlung process. As with the other x-ray embodiment, any electrons that penetrate the thin foil 88 are deflected into a beam dump 84" using magnets 86". The x-ray beam 22" is scannable by rotating the breadboard 58" (not shown) that the optics and gas jet are mounted on. Feedback control of the laser and target parameters can be used to optimize the electron or x-ray output for the particular detection technique being used.

Detection of Contents Using X-Ray Beam

As the x-ray beam 22' or 22" passes through the container of interest 30, it will interact (or not interact) with the container's contents 28. The resulting interactions create signals 34' that are detected by detectors 32' through a variety of techniques in order to determine whether the container 30 contains contents 28 of interest to the inspector. The radiographic techniques discussed above for use with the electron beam 22 (e.g., the fluorescent screen/array detector and nuclear activation technique) can also be used with x-ray beam 22' or 22". In addition to these techniques, there are other techniques for detecting the contents of containers using x-ray beam 22' or 22".

For instance, when a high-energy photon such as an x-ray is absorbed by a nucleus, it can create excited nuclear state. These excited states typically lie in the MeV range and have linewidths <1 eV. When these excited nuclear states decay, γ-photons with characteristic energies are emitted isotropically that can be resolved by high-resolution detectors (such as a high-purity cooled Germanium crystal). These characteristic energies form a unique signature based on the isotope being excited. This nuclear resonance fluorescence process can be used to detect the presence of materials of interest by placing a high-purity cooled Germanium crystal detector located off axis to look for these characteristic energy signals.

A notch filter composed of the same material as the material of interest can be placed in front of the detector. The difference between the signal detected with the filter and that detected by an unfiltered normalization detector can increase the signal-to-background ratio.

Portability

Because of the small size of its components, any of the exemplary embodiments of the entire laser wakefield electron beam system 10 described above can readily fit within a 100-200 ft$^2$ footprint, enabling the system to be placed in a large truck or semi-tractor trailer 38, which also makes the entire system portable for use at various facilities, buildings, or locations depending on the needs of the inspector.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

We claim:

1. An apparatus for remotely examining contents of a container, the apparatus comprising:
    a laser source that produces a sub-picosecond laser pulse with at least a terawatt peak power;
    an adjustable support;
    an optical focusing element mounted on the adjustable support;
    a laser target positioned to receive the sub-picosecond laser pulse and mounted on the adjustable support;
    a laser wakefield beam of electrons that emerges from the laser target due to focusing the sub-picosecond laser pulse by the optical focusing element onto the laser target;
    wherein the adjustable support rotates about at least one axis of rotation and rotates the laser wakefield beam of electrons in a direction to examine contents of the container;
    a detector that detects a signal emitted from interaction between the laser wakefield beam of electrons and contents of the container.

2. The apparatus of claim 1 in which the sub-picosecond laser pulse is comprised of multiple sub-picosecond laser pulses of different pulse durations.

3. The apparatus of claim 1 in which the laser target is comprised of one of a gas, a cluster, a discharge ionized plasma, and a solid.

4. The apparatus of claim 3 in which the gas is comprised of one of neutral hydrogen, discharged ionized hydrogen, neutral helium, discharge ionized helium, neutral nitrogen, and discharge ionized nitrogen.

5. The apparatus of claim 1 in which the adjustable support rotates about two axes of rotation.

6. The apparatus of claim 1 in which the container is comprised of one of a shipping container, a cargo container, a piece of luggage, a vehicle, a boat, an airplane, an ore container, a hopper, a cart, a conveyor, and a waste container.

7. The apparatus of claim 1 in which the apparatus is portable.

8. The apparatus of claim 7 in which the apparatus is located on a vehicle.

9. An apparatus for remotely examining contents of a container, the apparatus comprising:
    a laser source that produces a first sub-picosecond laser pulse with at least a terawatt peak power and a second laser pulse;
    an adjustable support;
    a first optical focusing element mounted on the adjustable support;
    a second optical focusing element mounted on the adjustable support;
    a laser target positioned to receive the first sub-picosecond laser pulse and mounted on the adjustable support;
    a laser wakefield beam of electrons that emerges from the laser target due to focusing the first sub-picosecond laser pulse by the first optical focusing element onto the laser target;
    a Thomson-scattered x-ray beam that emerges from the laser wakefield beam of electrons due to focusing the second laser pulse by the second optical focusing element onto the laser wakefield beam of electrons;
    wherein the adjustable support rotates about at least one axis of rotation and rotates the Thomson-scattered x-ray beam in a direction to examine contents of the container; and
    a detector that detects a signal emitted from interaction between the Thomson-scattered x-ray beam and contents of the container.

10. The apparatus of claim 9 in which the first sub-picosecond laser pulse is comprised of multiple sub-picosecond laser pulses of different pulse durations.

11. The apparatus of claim 9 in which the laser target is comprised of one of a gas, a cluster, a discharge ionized plasma, and a solid.

12. The apparatus of claim 11 in which the gas is comprised of one of neutral hydrogen, discharged ionized hydrogen, neutral helium, discharge ionized helium, neutral nitrogen, and discharge ionized nitrogen.

13. The apparatus of claim 9 in which the adjustable support rotates about two axes of rotation.

14. The apparatus of claim 9 in which the container is comprised of one of a shipping container, a cargo container, a piece of luggage, a vehicle, a boat, an airplane, an ore container, a hopper, a cart, a conveyor, and a waste container.

15. The apparatus of claim 9 in which the apparatus is portable.

16. The apparatus of claim 15 in which the apparatus is located on a vehicle.

17. An apparatus for remotely examining contents of a container, the apparatus comprising:
    a laser source that produces a sub-picosecond laser pulse with at least a terawatt peak power;
    an adjustable support;
    an optical focusing element mounted on the adjustable support;
    a laser target positioned to receive the sub-picosecond laser pulse and mounted on the adjustable support;
    a laser wakefield beam of electrons that emerges from the laser target due to focusing the sub-picosecond laser pulse by the optical focusing element onto the laser target;
    an x-ray converter target positioned to receive the laser wakefield beam of electrons and mounted on the adjustable support;

a Bremsstrahlung x-ray beam that emerges from the x-ray converter target due to the laser wakefield beam of electrons striking the x-ray converter target;
wherein the adjustable support rotates about at least one axis of rotation and rotates the Bremsstrahlung x-ray beam in a direction to examine contents of the container;
a detector that detects a signal emitted from interaction between the Bremsstrahlung x-ray beam and contents of the container.

18. The apparatus of claim 17 in which the sub-picosecond laser pulse is comprised of multiple sub-picosecond laser pulses of different pulse durations.

19. The apparatus of claim 17 in which the laser target is comprised of one of a gas, a cluster, a discharge ionized plasma, and a solid.

20. The apparatus of claim 19 in which the gas is comprised of one of neutral hydrogen, discharged ionized hydrogen, neutral helium, discharge ionized helium, neutral nitrogen, and discharge ionized nitrogen.

21. The apparatus of claim 17 in which the x-ray converter target is comprised of one of beryllium, iron, and tantalum.

22. The apparatus of claim 17 in which the adjustable support rotates about two axes of rotation.

23. The apparatus of claim 17 in which the container is comprised of one of a shipping container, a cargo container, a piece of luggage, a vehicle, a boat, an airplane, an ore container, a hopper, a cart, a conveyor, and a waste container.

24. The apparatus of claim 17 in which the apparatus is portable.

25. The apparatus of claim 24 in which the apparatus is located on a vehicle.

26. A method for remotely examining contents of a container, the method comprising:
producing a sub-picosecond laser pulse with at least a terawatt of peak power;
focusing the sub-picosecond laser pulse onto a laser target to create a laser wakefield beam of electrons;
rotating the laser wakefield beam of electrons about at least one axis of rotation to examine the container; and
detecting a signal emitted from the interaction of the laser wakefield beam of electrons with contents of the container.

27. The method of claim 26 in which the sub-picosecond laser pulse is comprised of multiple sub-picosecond laser pulses of different pulse durations.

28. The method of claim 26 further comprising the step of adjusting energy of the laser wakefield beam of electrons by adjusting peak power of the sub-picosecond laser pulse.

29. The method of claim 26 in which the laser target is comprised of one of a gas, a cluster, a discharge ionized plasma, and a solid.

30. The method of claim 29 in which the gas is comprised of one of neutral hydrogen, discharged ionized hydrogen, neutral helium, discharge ionized helium, neutral nitrogen, and discharge ionized nitrogen.

31. The method of claim 26 in which the container is comprised of one of a shipping container, a cargo container, a piece of luggage, a vehicle, a boat, an airplane, an ore container, a hopper, a cart, a conveyor, and a waste container.

32. A method for remotely examining contents of a container, the method comprising:
producing a first sub-picosecond laser pulse with at least a terawatt of peak power;
producing a second laser pulse;
focusing the first sub-picosecond laser pulse onto a laser target to create a laser wakefield beam of electrons;
focusing the second laser pulse onto the laser wakefield beam of electrons to create a Thomson-scattered x-ray beam;
rotating the Thomson-scattered x-ray beam about at least one axis of rotation to examine the container; and
detecting a signal emitted from interaction of the Thomson-scattered x-ray beam with contents of the container.

33. The method of claim 32 in which the first sub-picosecond laser pulse is comprised of multiple sub-picosecond laser pulses of different pulse durations.

34. The method of claim 32 further comprising the step of adjusting energy of the Thomson-scattered x-ray beam by adjusting energy of the laser wakefield beam of electrons.

35. The method of claim 32 further comprising the step of adjusting energy of the Thomson-scattered x-ray beam by adjusting photon energy of the second laser pulse.

36. The method of claim 32 further comprising the step of adjusting energy of the Thomson-scattered x-ray beam by adjusting intensity of the second laser pulse.

37. The method of claim 32 in which the laser target is comprised of one of a gas, a cluster, a discharge ionized plasma, and a solid.

38. The method of claim 37 in which the gas is comprised of one of neutral hydrogen, discharged ionized hydrogen, neutral helium, discharge ionized helium, neutral nitrogen, and discharge ionized nitrogen.

39. The method of claim 32 in which the container is comprised of one of a shipping container, a cargo container, a piece of luggage, a vehicle, a boat, an airplane, an ore container, a hopper, a cart, a conveyor, and a waste container.

40. A method for remotely examining contents of a container, the method comprising:
producing a sub-picosecond laser pulse with at least a terawatt of peak power;
focusing the sub-picosecond laser pulse onto a laser target to create a laser wakefield beam of electrons;
directing the laser wakefield beam of electrons to strike an x-ray converter target to create a Bremsstrahlung x-ray beam;
rotating the Bremsstrahlung x-ray beam about at least one axis of rotation to examine the container; and
detecting a signal emitted from interaction of the Bremsstrahlung x-ray beam with contents of the container.

41. The method of claim 40 in which the sub-picosecond laser pulse is comprised of multiple sub-picosecond laser pulses of different pulse durations. The method of claim 40 further comprising the step of adjusting energy of the Bremsstrahlung x-ray beam by adjusting energy of the laser wakefield beam of electrons.

42. The method of claim 40 in which the laser target is comprised of one of a gas, a cluster, a discharge ionized plasma, and a solid.

43. The method of claim 42 in which the gas is comprised of one of neutral hydrogen, discharged ionized hydrogen, neutral helium, discharge ionized helium, neutral nitrogen, and discharge ionized nitrogen.

44. The method of claim 40 in which the x-ray converter target is comprised of one of beryllium, iron, and tantalum.

45. The method of claim 40 in which the container is comprised of one of a shipping container, a cargo container, a piece of luggage, a vehicle, a boat, an airplane, an ore container, a hopper, a cart, a conveyor, and a waste container.

* * * * *